United States Patent [19]

Yamamoto

[11] Patent Number: 5,539,489
[45] Date of Patent: Jul. 23, 1996

[54] SINGLE-LENS REFLEX CAMERA

[75] Inventor: Katsuhiko Yamamoto, Saitama-ken, Japan

[73] Assignee: Fuji Photo Optical Co., Ltd., Saitama-ken, Japan

[21] Appl. No.: 500,248

[22] Filed: Jul. 10, 1995

[30] Foreign Application Priority Data

Jul. 20, 1994 [JP] Japan .................................. 6-168379

[51] Int. Cl.⁶ ........................ G03B 19/10; G03B 19/12; G03B 13/10; G03B 17/02
[52] U.S. Cl. ........................ 354/160; 354/175; 354/222; 354/152; 354/159
[58] Field of Search .................................. 354/160, 175, 354/222, 159, 152

[56] References Cited

U.S. PATENT DOCUMENTS

| 3,797,027 | 3/1974 | Sakagami | 354/203 |
|---|---|---|---|
| 4,125,849 | 11/1978 | Law | 354/112 |
| 4,304,477 | 12/1981 | Green | 354/112 |
| 4,597,655 | 7/1986 | Mann | 354/121 |
| 4,611,895 | 9/1986 | Seely | 354/159 |
| 5,477,293 | 12/1995 | Osakabe | 354/159 |

FOREIGN PATENT DOCUMENTS

54-7577  4/1979  Japan .

Primary Examiner—Michael L. Gellner
Assistant Examiner—Daniel Chapik
Attorney, Agent, or Firm—Leydig, Voit & Mayer

[57] ABSTRACT

A single-lens reflex camera comprises a camera body, a lens system, a film holder having a rectangular aperture and mounted as rotatable relative to the camera body, a mirror that can reflect light, which is to enter the aperture, a focusing screen for transmitting the light reflected by the mirror, rotation shafts disposed perpendicular to the focusing screen, mask plates arranged to rotate in parallel to the focusing screen and about the rotation shafts to change an area of light passing through the focusing screen, and a motion transmitting mechanism for connecting the film holder with the mask plates. The camera of the present invention is provided with the finder screen frame changeover apparatus utilizing the compact and simple mechanism composed of a small number of components, as compared with the conventional apparatus.

8 Claims, 6 Drawing Sheets

SINGLE-LENS REFLEX CAMERA

BACKGROUND OF THE INVENTION

1. Field of the Invention

The present invention relates to a single-lens reflex camera, particularly a medium- or large-format camera, having a revolving back that can rotate a film holder relative to a camera body. More specifically, the present invention concerns a single-lens reflex camera that can change an area (so-called finder screen frame) of light passing through a focusing screen (focusing glass) in correspondence to rotation of the film holder.

2. Related Background Art

An example of the apparatus that can change the so-called finder screen frame in correspondence to rotation of the film holder is the apparatus as described in the bulletin of Japanese Patent Publication No. 54-7577 (corresponding to the bulletin of Japanese Laid-open Patent Application No. 51-66826).

SUMMARY OF THE INVENTION

The inventor, however, found out that the conventional single-lens reflex cameras provided with such apparatus had the following problems.

Namely, the so-called finder screen frame changeover apparatus, used in the conventional single-lens reflex medium-format cameras, used a complex mechanism composed of a lot of components for changing the area of the light passing through the focusing screen in correspondence to rotation of the film holder. Thus, the conventional single-lens reflex cameras provided with such apparatus had problems that the production cost increased, that there were limits on decreasing the weight and facilitating production, and that a probability of breakdown increased.

An object of the present invention is to provide a single-lens reflex camera which is provided with a so-called finder screen frame changeover apparatus using a compact and simple mechanism composed of a small number of components as compared with the conventional apparatus and which is, therefore, low in production cost, light in weight, easy in production, and low in probability of breakdown.

A single-lens reflex camera of the present invention comprises:

a camera body;

a lens system mounted to said camera body;

a film holder having a rectangular aperture (so-called photographic screen frame) adjacent sides of which are different from each other, said film holder being mounted to said camera body so as to be rotatable about an optical axis of light incident through said lens system into said aperture, said aperture being changed over between a first position (for example, a so-called vertical position) and a second position (for example, a so-called horizontal position) by rotating said film holder by 90 degrees about said optical axis;

a mirror mounted to said camera body and arranged as movable between a reflecting position where said mirror reflects light, which is to enter said aperture, so as to change a direction of the optical axis of said light and a non-reflecting position where said mirror lets said light enter said aperture without influencing said light;

a focusing screen mounted to said camera body and transmitting the light reflected by said mirror;

rotation shafts arranged to project from near edges of said focusing screen so as to be perpendicular to said focusing screen;

mask plates supported on said rotation shafts and arranged to rotate about said rotation shafts in parallel with said focusing screen so as to change an area (so-called finder screen frame) of light passing through said focusing screen; and motion transmitting means connecting said film holder with said mask plates and arranged to rotate said mask plates in accordance with rotation of said film holder.

In an aspect of the camera of the present invention, the film holder is provided with a cam, pinion gears supported on the rotation shafts are fixed to the respective mask plates, and the motion transmitting means comprises a contact portion in contact with said cam and rack gears meshing with the associated pinion gears. The motion transmitting means is driven through said cam and said contact portion when the film holder rotates, whereby said mask plates rotate through said rack gears and said pinion gears.

Preferably, the focusing screen is square, and the rotation shafts are arranged to project from near four corners of said focusing screen so as to be perpendicular to said focusing screen. Also preferably, each of said mask plates has a first end connected to said rotation shaft and a second end being a free end, and the mask plates are disposed on a single plane parallel to said focusing screen and are arranged so that the second ends of adjacent mask plates can be opposed to each other.

In the camera of the present invention, when the film holder rotates to change the aperture (so-called photographic screen frame) provided in the film holder into either the so-called horizontal position or vertical position, the rotation of the film holder is transmitted to the mask plates by the motion detecting means to rotate the mask plates in parallel with the focusing screen. This changes the area of the light passing through the focusing screen, so that the field (so-called finder screen frame) of the finder is changed into either the so-called horizontal position or vertical position in accordance with the position of the aperture.

Since in the camera of the present invention the mask plates rotate in parallel with the focusing screen in the above manner, it needs only a small space for arrangement and movement of the mask plates. In the camera of the present invention the all mask plates always efficiently contribute to shielding the light passing through the focusing screen. Namely, the all mask plates according to the present invention function as both mask plates for keeping the so-called finder screen frame at the so-called horizontal position and mask plates for keeping it at the so-called vertical position. Accordingly, the mask plates according to the present invention are compact, small in number of components, and simple in mechanism, as compared with the conventional ones. Further, in addition to the simple mechanism of the mask plates to be driven, a simple mechanism can also be employed for the motion transmitting means for transmitting the rotation of the film holder to the mask plates, as compared with the conventional mechanism, which decreases the number of components.

Accordingly, the finder screen frame changeover apparatus according to the present invention can be constructed using a compact and simple mechanism composed of a small number of components, as compared with the conventional apparatus. Therefore, the single-lens reflex camera of the present invention provided with the finder screen frame changeover apparatus according to the present invention is low in production cost, light in weight, easy in production, and low in probability of breakdown.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

The embodiments of the present invention will be described by reference to the accompanying drawings. In the drawings, same or equivalent portions will be denoted by same reference numerals.

Figure 1:
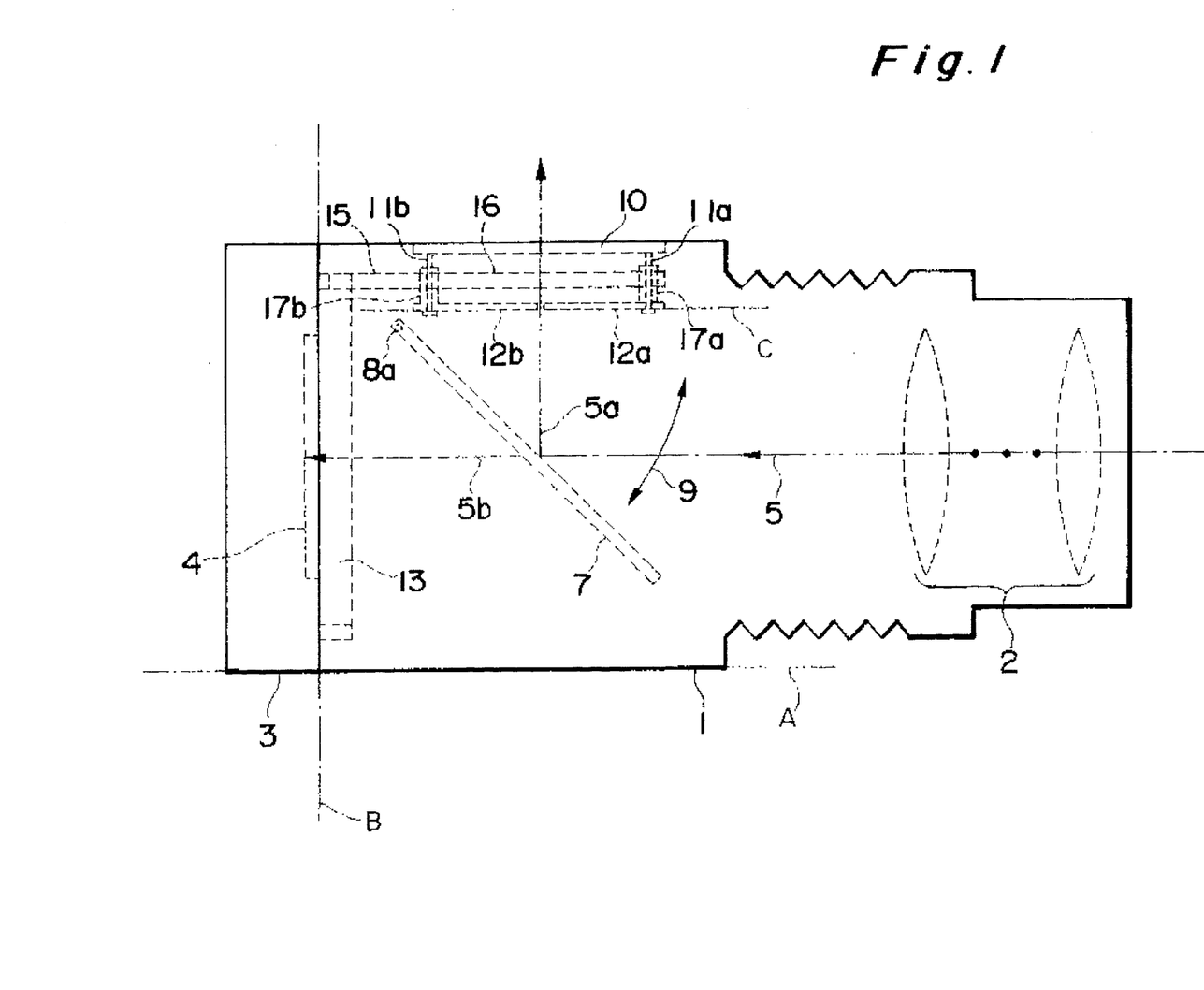
FIG. 1 is a schematic side view of an example of a single-lens reflex medium-format camera of the present invention.
Figure 2:
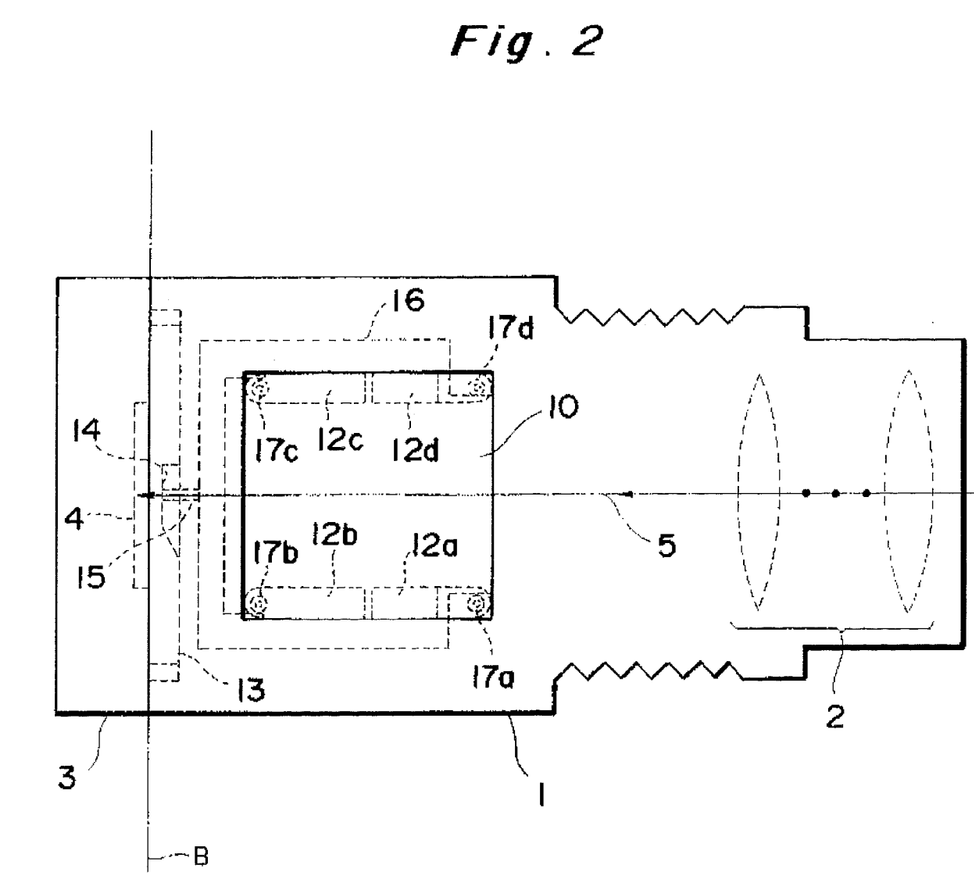
FIG. 2 is a schematic top plan view of the single-lens reflex medium-format camera of the present invention as shown in FIG. 1.

A single-lens reflex camera according to the present invention is provided, as shown in FIG. 1 and FIG. 2, with a camera body 1; a lens system 2 mounted to the camera body 1; and a rectangular aperture 4 (so-called photographic screen frame) having different lengths of adjacent sides (between a pair of long sides 4a and a pair of short sides 4b), and further has a film holder 3 mounted to the camera body 1 so as to be rotatable about an optical axis 5 of light incident through the lens system 2 into the aperture 4.

Figure 3:
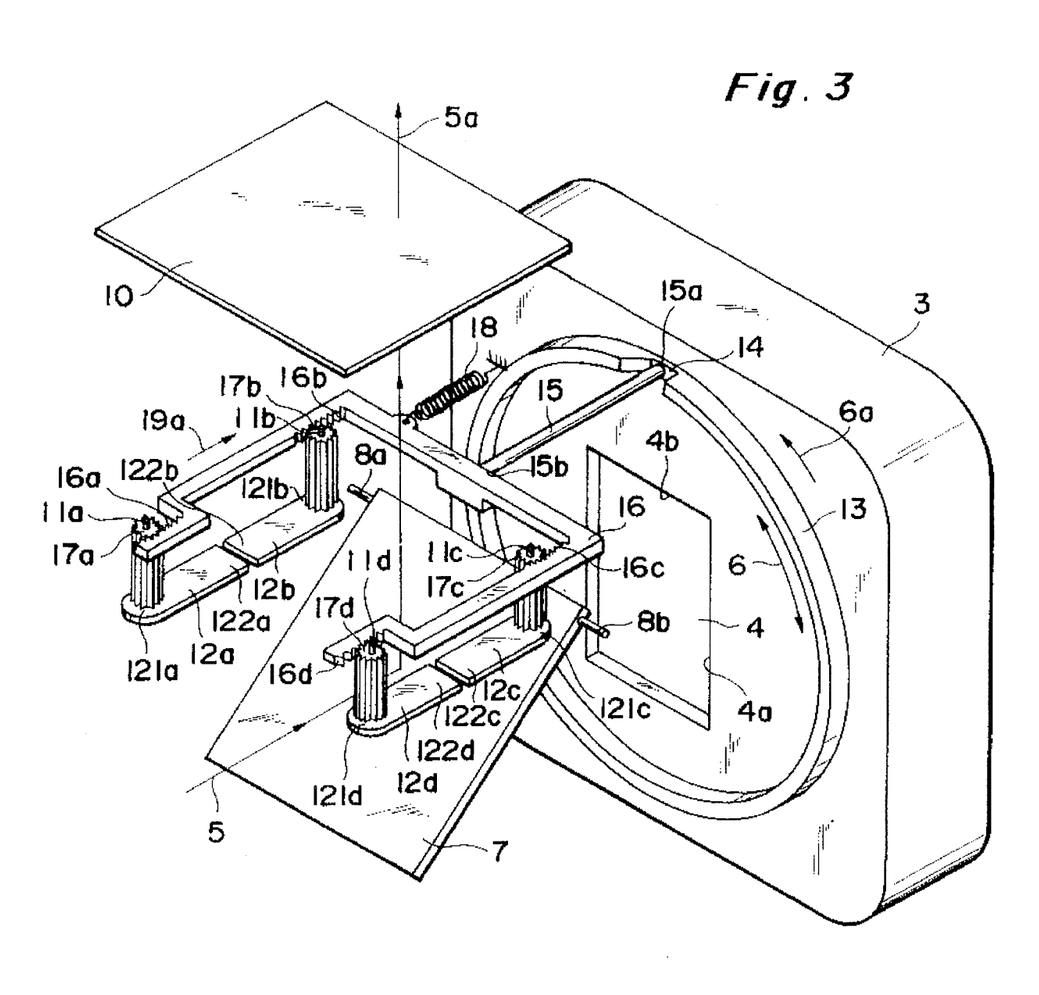
FIG. 3 is an exploded, perspective view to show the internal structure of the single-lens reflex medium-format camera of the present invention as shown in FIG. 1, wherein a so-called photographic screen frame is arranged at a so-called vertical position.
Figure 4:
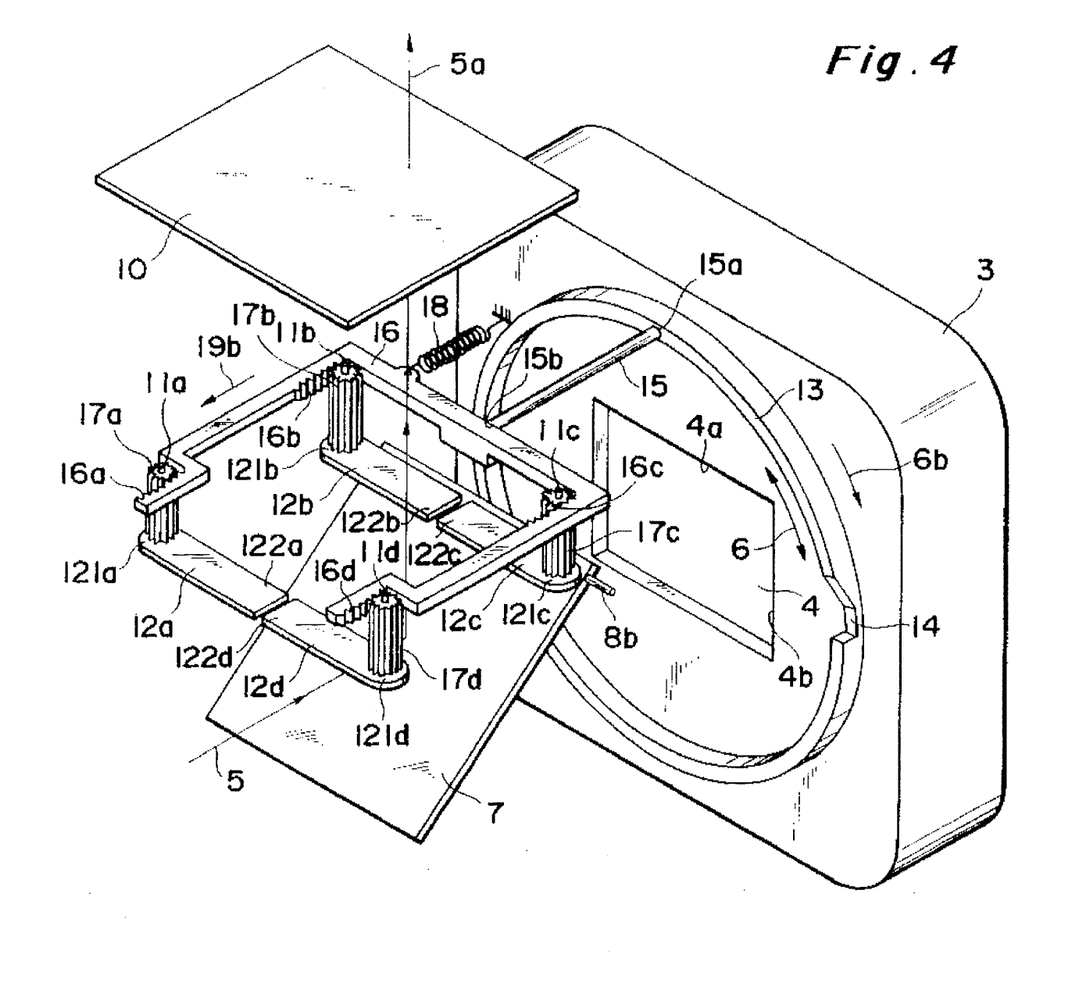
FIG. 4 is an exploded, perspective view to show the internal structure of the single-lens reflex medium-formal camera of the present invention as shown in FIG. 1, wherein the so-called photographic screen frame is arranged at a so-called horizontal position.

Thus, rotating the film holder 3 by 90 degrees about the optical axis 5 (along a double-headed arrow 6 in FIGS. 3 and 4), the aperture 4 can be changed over between a first position (so-called vertical position) where the long sides 4a of the aperture 4 are perpendicular a bottom face A of the camera body 1 as shown in FIG. 3 and a second position (so-called horizontal position) where the long sides 4a of the aperture 4 are parallel to the bottom face A of the camera body 1 as shown in FIG. 4

Further, the single-lens reflex camera of the present invention is provided with a mirror 7 supported through support shafts 8a, 8b on the camera body 1. An unrepresented drive device rotates the mirror 7 about the support shafts 8a, 8b (along the double-headed arrow 9 in FIG. 1), so that the mirror 7 is arranged as movable between a reflecting position for reflecting light incident through the lens system 2 thereinto to change the direction of the optical axis of the light (from 5 to 5a) and a non-reflecting position for letting the light enter the aperture without influencing the light (from 5 to 5b). FIG. 1 shows the mirror 7 located at the reflecting position.

Further, a focusing screen (focusing glass) 10 for transmitting the light (5a) reflected by the mirror 7 is mounted in the upper part of the camera body 1, and a finder is constructed including the focusing screen 10. In the present embodiment, the focusing screen 10 is square, and is arranged in parallel with the bottom face A of the camera body 1 and perpendicular to a main surface B of the film holder 3.

In addition, the single-lens reflex camera of the present invention is further provided with:

rotation shafts (11a–11d) projecting near the edges of the focusing screen 10 (near the four corners) so as to be perpendicular to the focusing screen 10;

mask plates (12a–12d) supported by the corresponding rotation shafts (11a–11d) so as to be rotatable in parallel to the focusing screen 10 and about the respective rotation shafts; and a motion transmitting means, connecting the film holder 3 to the mask plates (12a–12d), for rotating the mask plates (12a–12d) in accordance with rotation of the film holder 3.

In the present embodiment, as shown in FIGS. 3 and 4, each of the mask plates (12a–12d) has a first end (121a–121d) connected to the rotation shaft (11a–11d) and a second end (122a–122d) being a free end in no contact with other members. The all mask plates (12a–12d) are arranged on a single plane C parallel to the focusing screen 10, and are arranged so that the second ends of adjacent mask plates (122a–122b and 122c–122d: 122a–122d and 122b–122c) can be opposed to each other.

Figure 5:
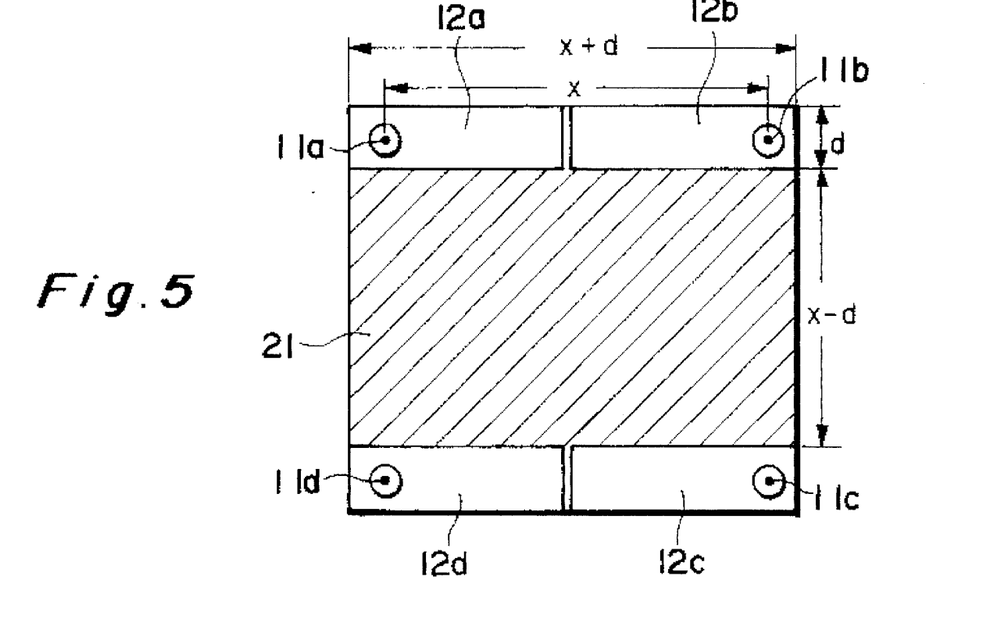
FIG. 5 is an explanatory drawing to show a relation between the width of mask plates and a separation between rotation shafts according to the present invention.
Figure 6:
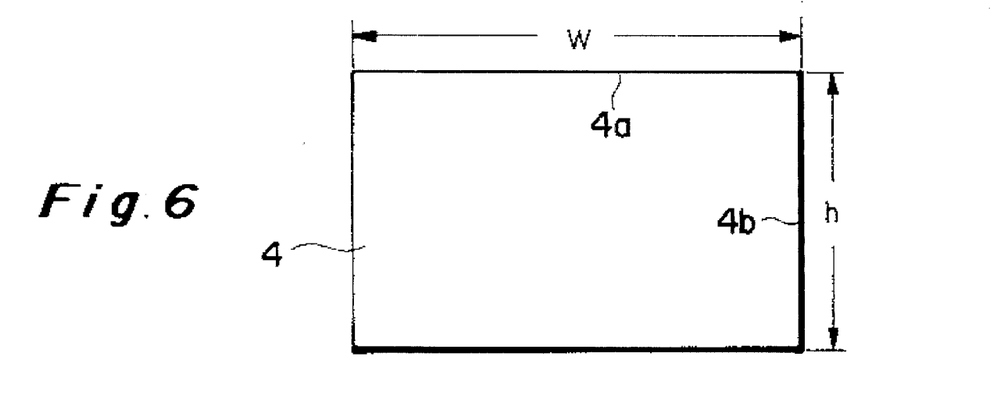
FIG. 6 is an explanatory drawing to show an aspect ratio of an aperture portion according to the present invention.

Further, the present embodiment is arranged to satisfy the following relation of equation (1) among the width (d) of the mask plates (12a–12d), the distance (x) between the rotation shafts (11a–11d) as shown in FIG. 5, and the aspect ratio of the aperture 4, {w (length of long sides 4a)/h (length of short sides 4b)}, as shown in FIG. 6.

$$d=[\{(w/h)-1\}/\{(w/h)+1\}]x \qquad (1)$$

Therefore, an aspect ratio $\{(x+d)/(x-d)\}$ of an area 21 (the hatched portion in FIG. 5) defined by the mask plates (12a–12d) is equal to the aspect ratio $\{w/h\}$ of the aperture 4.

In the present embodiment the above motion transmitting means is constructed in the following arrangement.

As shown in FIGS. 3 and 4, a cam 13 is mounted on the film holder 3, and a recess (cam groove) 14 is formed in the cam 13. The cam 13 functions as a guide ring when the film holder 3 rotates relative to the camera body 1. A contact portion 15a, which is one end of a connecting rod 15, is in contact with the recess 14, and the other end 15b of the connecting rod 15 is fixed to a rack gear member 16. In this manner the connecting rod 15 and rack gear member 16 compose the above motion transmitting means. A plurality of rack gears 16a–16d are formed in the rack gear member 16, and a pinion gear 17a–17d is meshed with the each rack gear 16a–16d. The mask plates 12a–12d are fixed to the associated pinion gears 17a–17d. The diameter of the pinion gears 17a–17d is preferably smaller than the width (d) of the mask plates 12a–12d. A tension spring 18 is set between the rack gear member 16 and the camera body 1, and the rack gear member 16 is energized toward the film holder 3 by the tension spring 18. A mechanism for restricting moving directions of the connecting rod 15 and rack gear member 16 is omitted to illustrate.

Next described referring to FIGS. 3, 4, 7, and 8 is the operation when the film holder 3 is rotated in the single-lens reflex medium-format camera of the present invention.

In a state to determine photographic conditions of object, the mirror 7 supported through the support shafts 8a, 8b on the camera body 1 is located at the position shown in FIGS. 3 and 4 (at the reflecting position), and the light 5 incident from the lens system 2 thereto is reflected by the mirror 7 to travel through the focusing screen 10 (from 5 to 5a). In this state the film holder 3 is rotated in the direction of 6a in FIG. 3 to bring the aperture (so-called photographic screen frame) 4 to the first position (so-called vertical position) shown in FIG. 3. On this occasion, the contact portion 15a comes into contact with the recess 14 in the cam 13, so that the connecting rod 15 and rack gear member 16 are drawn by the tension spring 18 to the position near the film holder 3 (the state after they have moved in the direction of the arrow 19a in FIG. 3).

Since the rack gears 16a–16d are formed in the rack gear member 16, the pinion gears 17a–17d rotate with the movement of the rack gear member 16. From the relation of the meshing positions, the rotation directions on this occasion (rotation directions as observed from the side of focusing screen 10) are so determined that those of the pinion gear 17a and pinion gear 17c are the same, counterclockwise, and those of the pinion gear 17b and pinion gear 17d are the same, clockwise. This arrangement can rotate the mask plates 12a–12d in parallel with the focusing screen 10 and can change the area (so-called finder screen frame) of the light 5a passing through the focusing screen by the mask plates 12a–12d.

Figure 7:
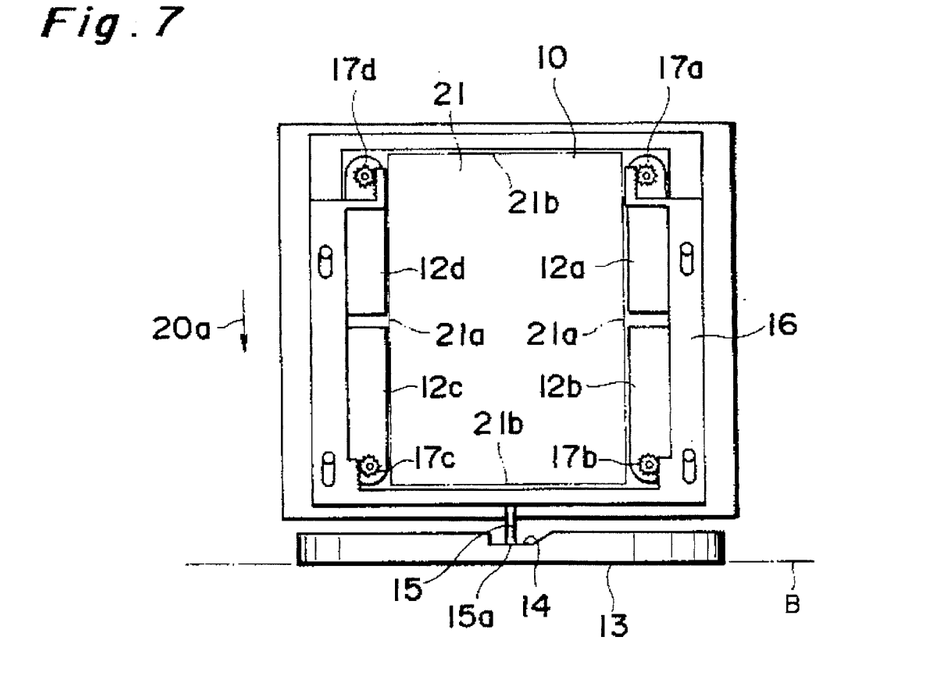
FIG. 7 is a schematic top plan view to show a state of the mask plates and focusing screen, as shown in FIG. 3.

FIG. 7 is a schematic top plan view to show a state of the focusing screen 10 on this occasion. In this state, the contact portion 15a is in contact with the recess 14 of the cam 13, the rack gear member 16 is moved in the direction of the arrow 20a in FIG. 7, and the mask plates 12a–12d are aligned in the direction perpendicular to the main surface B of the film holder 3 so as to be in the state to shield the left and right portions (in FIG. 7) of the light 5a passing through the focusing screen 10. By this, short sides 21b of the light-transmitting area 21 surrounded by a pair of long sides 21a defined by the mask plates 12a–12d and a pair of short sides 21b defined by the edges of the focusing screen 10 become parallel to the main surface B of the film holder 3.

In this manner the left and right portions (in FIG. 7) of the field as observed from the focusing screen 10 become shielded by the mask plates 12a–12d (at the so-called vertical position), whereby an image projected onto the focusing screen 10 becomes approximately coincident with an image to be projected onto the aperture 4 in the film holder 3.

Next described is a case where the film holder 3 is rotated in the direction of 6b in FIG. 4 by 90 degrees from the position of FIG. 3 whereby the aperture 4 is brought into the second state (so-called horizontal position) shown in FIG. 4.

Since the contact portion 15a is in contact with a portion of the cam 13 other than the recess 14 on this occasion, the connecting rod 15 and rack gear member 16 stretch the tension spring 18 and are located away from the film holder 3 (in the state after they have moved in the direction of the arrow 19b in FIG. 4).

As the rack gear member 16 moves in this direction, the pinion gears 17a–17d rotate. The rotation directions on this occasion (rotation directions as observed from the side of the focusing screen 10) are so determined that those of the pinion gear 17a and pinion gear 17c are the same, clockwise and those of the pinion gear 17b and pinion gear 17d are the same, counterclockwise. This arrangement rotates the mask plates 12a–12d by 90 degrees in parallel with the focusing screen 10 and changes the area (so-called finder screen frame) of the light 5a passing through the focusing lens by the mask plates 12a–12d.

Figure 8:
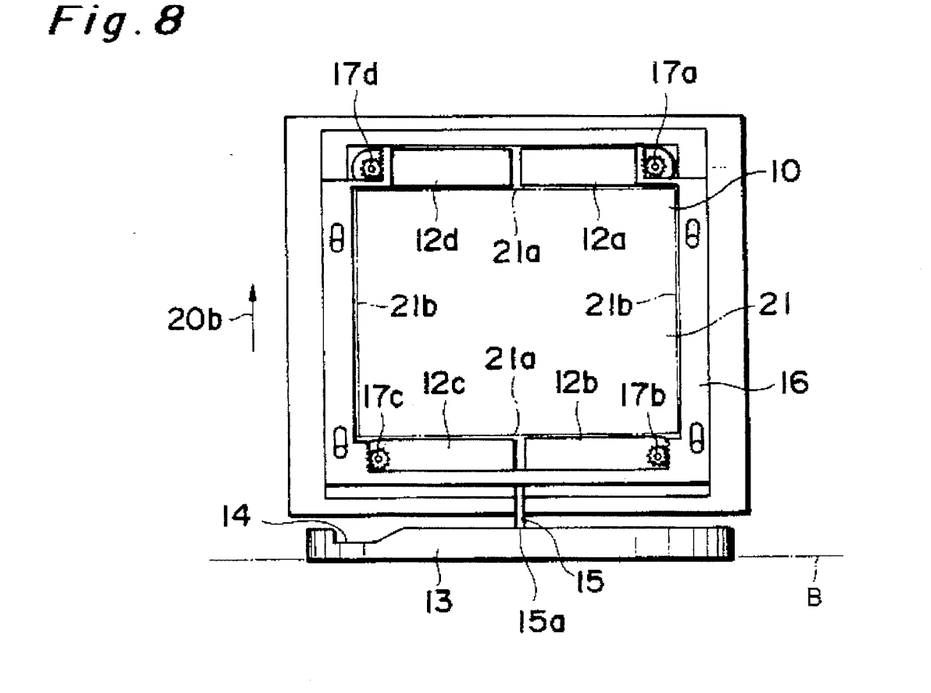
FIG. 8 is a schematic top plan view to show a state of the mask plates and focusing screen, as shown in FIG. 4.

FIG. 8 is a schematic top plan view to show a state of the focusing screen 10 on this occasion. In this state, the contact portion 15a is in contact with the portion of cam 13 other than the recess 14, the rack gear member 16 is moved in the direction of the arrow 20b in FIG. 8, and the mask plates 12a–12d are arranged in parallel with the main surface B of the film holder 3, thereby shielding the upper and lower portions (in FIG. 8) of the light 5a passing through the focusing screen 10. By this, the long sides 21a of the light-transmitting area 21 become parallel to the main surface B of the film holder 3.

In this manner the upper and lower portions (in FIG. 8) of the field as observed from the focusing screen 10 become shielded by the mask plates 12a–12d (at the so-called horizontal position), whereby an image projected onto the focusing screen 10 becomes approximately coincident with an image to be projected onto the aperture 4 in the film holder 3 in this case as well.

As shown in FIGS. 7 and 8, the rotation shafts 11a–11d of the mask plates 12a–12d, and the pinion gears 17a–17d project from near the four corners of the focusing screen 10 so as to be perpendicular to the focusing screen 10. Therefore, these do not obstruct the image (so-called finder screen) as seen from the focusing screen 10, which would be approximately coincident with an image (so-called photographic screen) to be projected onto the aperture 4 in the film holder 3. In other words, the focusing screen 10 (i.e., the finder) in the present embodiment is square, whereas the aperture 4 (so-called photographic screen frame) is rectangular. Because of this arrangement, the light to enter the aperture 4 does not pass through the four corners of the focusing screen either in the case where the aperture 4 is set at the so-called vertical position (FIG. 13) or in the case where the aperture 4 is set at the so-called horizontal position (FIG. 4). Namely, the four corners of the focusing screen 10 are unnecessary places for projection of image (so-called finder screen). Accordingly, the present invention is directed to simplification of the changeover apparatus for changing over the field (so-called finder screen frame) in the finder, effectively utilizing these places.

The present embodiment is so arranged that the cam 13 has the recess 14 for transmitting a motion to the connecting rod 15, but a projection may be formed in the cam 13 for the same purpose. Also, the present embodiment employed the connecting rod 15, rack gear member 16, and pinion gears 17a–17d for converting a rotational motion of the film holder 3 into rotational motions of the mask plates 12a–12d, but the same function may be achieved using a train of gears, a link mechanism, a cam, etc.

Although the present embodiment was described as to the single-lens reflex medium-format camera, it is noted that the present invention can be applied to single-lens reflex large-format cameras etc.

As described above, the present invention can provide the finder screen frame changeover apparatus as constructed using the compact and simple mechanism composed of a small number of components, as compared with the conventional apparatus. Therefore, the single-lens reflex camera of the present invention provided with the finder screen frame changeover apparatus is low in production cost, light in weight, easy in production, and low in probability of breakdown.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 168379/1994 (6-168379) filed on Jul. 20, 1994 is hereby incorporated by reference.

What is claimed is:

1. A single-lens reflex camera comprising:

a camera body;

a lens system mounted to said camera body;

a film holder having a rectangular aperture adjacent sides of which are different from each other, said film holder being mounted to said camera body so as to be rotatable about an optical axis of light incident through said lens system into said aperture, said aperture being changed over between a first position and a second position by rotating said film holder by 90 degrees about said optical axis;

a mirror mounted to said camera body and arranged as movable between a reflecting position where said mirror reflects light, which is to enter said aperture, so as to change a direction of the optical axis of said light and a non-reflecting position where said mirror lets said light enter said aperture without influencing said light;

a focusing screen mounted to said camera body and transmitting the light reflected by said mirror;

rotation shafts arranged to project from near edges of said focusing screen so as to be perpendicular to said focusing screen;

mask plates supported on said rotation shafts and arranged to rotate about said rotation shafts in parallel with said focusing screen so as to change an area of light passing through said focusing screen; and motion transmitting means connecting said film holder with said mask plates and arranged to rotate said mask plates in accordance with rotation of said film holder.

2. The camera according to claim 1, wherein said film holder is provided with a cam, pinion gears supported on said rotation shafts are fixed to said respective mask plates, said motion transmitting means comprises a contact portion in contact with said cam and rack gears meshing with said associated pinion gears, and said motion transmitting means is driven through said cam and said contact portion when said film holder rotates, whereby said mask plates rotate through said rack gears and said pinion gears.

3. The camera according to claim 1, wherein said focusing screen is square and said rotation shafts are arranged to project from near four corners of said focusing screen so as to be perpendicular to said focusing screen.

4. The camera according to claim 1, wherein each of said mask plates has a first end connected to said rotation shaft and a second end being a free end, and is arranged to be parallel to said focusing screen.

5. The camera according to claim 4, wherein said mask plates are disposed on a single plane parallel to said focusing screen and are arranged so that the second ends of adjacent mask plates can be opposed to each other.

6. The camera according to claim 1, wherein said mask plates each rotate 90 degrees about said rotation shafts in parallel with said focusing screen while said film holder rotates 90 degrees about said optical axis.

7. The camera according to claim 1, wherein a relation of the following equation holds among a width (d) of said mask plates, a distance (x) between said rotation shafts, and an aspect ratio (w/h) of said aperture:

$$d=[\{(w/h)-1\}/\{(w/h)+1\}]x.$$

8. The camera according to claim 1, wherein while long sides of said aperture are kept perpendicular to a bottom surface of said camera body, short sides of said area of the light passing, as defined by said mask plates, are parallel to a main surface of the film holder and wherein while the long sides of said aperture are kept parallel to the bottom surface of said camera body, long sides of said area of the light passing are parallel to the main surface of the film holder.

* * * * *